No. 777,597. PATENTED DEC. 13, 1904.
C. B. CARR.
APPARATUS FOR SEALING WEIGHTS.
APPLICATION FILED FEB. 19, 1904.
NO MODEL.
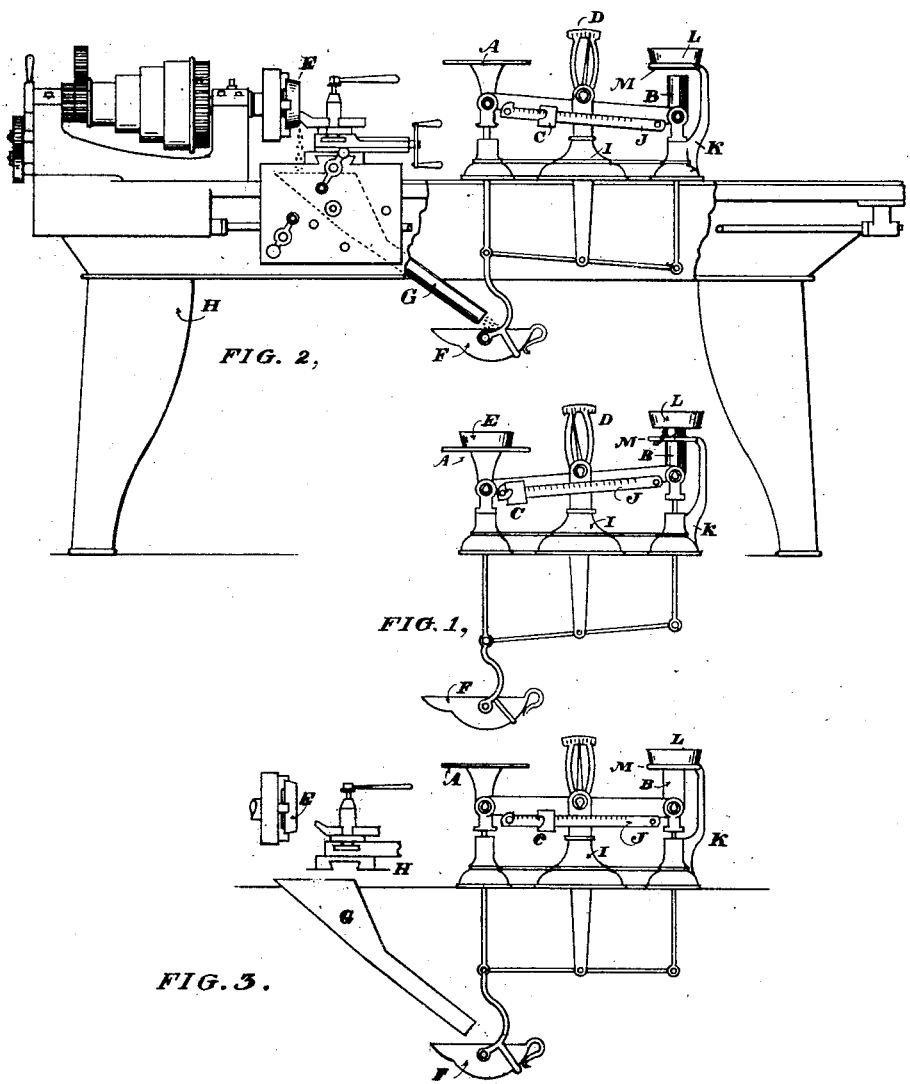

No. 777,597.

Patented December 13, 1904.

UNITED STATES PATENT OFFICE.

CHARLES B. CARR, OF ST. JOHNSBURY, VERMONT, ASSIGNOR TO THE E. & T. FAIRBANKS & COMPANY, OF ST. JOHNSBURY, VERMONT, A CORPORATION OF VERMONT.

APPARATUS FOR SEALING WEIGHTS.

SPECIFICATION forming part of Letters Patent No. 777,597, dated December 13, 1904.

Application filed February 19, 1904. Serial No. 194,411. (No model.)

*To all whom it may concern:*

Be it known that I, CHARLES B. CARR, a citizen of the United States, residing at St. Johnsbury, in the county of Caledonia, State of Vermont, have invented certain new and useful Improvements in Apparatus for Sealing Weights, of which the following is a description, reference being had to the accompanying drawings and to the letters of reference marked thereon.

My invention relates to an improved apparatus for use in preparing weights to be used on scales to render them of the proper weight when judged by the proper standard.

In the manufacture of weights of scales it is customary to cast them slightly heavier than needed and afterward to reduce the weight to the form of a given standard. This operation, which is technically known as "sealing," usually consists in drilling holes into the bottom of the casting until it agrees with the standard with which it is frequently compared. If too much is drilled out, the casting is plugged with lead until the weight is correct. As the bottom of the weight frequently contains a number of holes, an opportunity is offered for any evilly-disposed person to alter the sealing either by drilling more holes or by plugging lead into those already made, and this without detection, except by comparison with some accepted standard. This danger is so real that some governments refuse to accept weights sealed in this manner, requiring that the bottoms be turned off smoothly. Such an operation necessitates frequent removals from the lathe for trial, and it is the object of my invention to provide an improved apparatus for accomplishing the object in a simple and effective manner and in one operation instead of requiring frequent removals of the weight from the drilling apparatus.

It will be understood that while I have used the term "weight" in the description it will of course be understood in a generic and not a specific sense—as, for example, poises might be sealed to a given standard or two plates or pans or other scale parts may be sealed in the same manner, so that one will balance the other. Furthermore, while I have herein shown a lathe-tool for removing the surplus material from the weight to be sealed, it will be understood that this is merely shown by way of illustration, as any tool for removing surplus material may be used so long as it is so correlated to the weighing apparatus that the surplus material may be conducted thereto until the proper balance is secured.

The invention consists, primarily, in an apparatus for the purpose described, comprising a weighing-scale so arranged as to balance at a certain point when a standard weight is placed thereon and having means to bodily raise a standard weight from its support when a heavier weight to be sealed is placed on the scale, a poise or similar movable balance, means to indicate the amount of surplus material in the weight to be sealed and a tool for removing the surplus material from the weight to be sealed, and means for conducting the same to the scale to cause the same to balance.

Again, the invention consists in the weighing apparatus used and in various other matters heretofore described and referred to in the appended claims.

In the accompanying drawings, which illustrate a practical apparatus for carrying out the objects of my invention, Figure 1 represents a side view of the weighing device, showing the weight to be sealed as overbalancing the standard weight, the latter being lifted from its support by the weight of the blank or casting to be sealed. Fig. 2 is a side elevation of the weighing apparatus used in combination with the metal-working lathe, showing the position of the parts of the scale shown in Fig. 1 when the weight to be sealed has been removed and after the poise has been shifted to balance. Fig. 3 is a side elevation showing certain of the parts detached and the position of the weighing apparatus after enough surplus material has been fed to the scale to balance the same, thus indicating that the weight to be sealed is of the proper standard.

In the drawings, H represents an ordinary metal-lathe, on the rear end of which is mounted an even-balance scale I, having pans A F, both connected to the same end of the scale-lever. In place of a pan at the opposite end of the scale is a post B just heavy enough to counterbalance the two pans A F. Rising from the base of the scale is a support K, the upper portion of which is formed into a ring M. The purpose of this ring is to support the standard weight L just level with the top of the post when the beam is at balance and also to allow the post to rise up through the ring and lift up the weight during the process of sealing.

The operation of sealing is as follows: The standard weight is placed on the ring M and the blank to be sealed on the pan A. Fig. 1. There being nothing to balance it, the blank-weight will force this end of the scale down, allowing the other end to rise until the post B reaches the weight L. As the blank is on purpose made too heavy, the post will lift the standard weight off the ring, allowing it to rest on the scale. The poise C is moved along on the beam J until it balances, as shown by the pointer D. The position of the poise on the beam indicates the difference between the two weights, or, in other words, the amount which must be turned off from the blank before it will be equal to the sealed weight. The blank E is now removed and placed in the chuck of the lathe. This will allow the post B to be dropped below the level, leaving the standard weight supported on the ring, as shown in Fig. 2. The blank of casting E is now trimmed off by the lathe-tool or drilled out or milled, as the case may be, and the chips which fall are collected in the chute G and guided into the lower pan F until a sufficient quantity has been collected to balance the scale, the position of parts being shown in Fig. 3.

Various modifications and changes may be made without departing from the spirit of my invention.

Having thus described my invention, what I claim as new, and desire to secure by Letters Patent, is—

1. An apparatus for sealing weights, comprising a tool for removing surplus material from the weight to be sealed, a weighing apparatus embodying a beam, with a movable poise thereon, a scale-pan on one arm of said beam adapted to receive the weight to be sealed, a standard weight and support therefor, a device on the opposite end of the beam to balance the scale-pan, and to engage and lift the standard weight from its stationary support when the weight to be sealed is heavier than the standard weight, and means for conducting the surplus material to the weighing apparatus; substantially as described.

2. An apparatus for sealing weights, comprising a tool for removing surplus material from the weight to be sealed, a weighing apparatus embodying a beam, with a movable poise thereon, a scale-pan on one arm of said beam, adapted to receive the weight to be sealed, a standard weight and a stationary support therefor, a device on the opposite end of the beam to balance the scale-pan, and to engage and lift the standard weight from its stationary support when the weight to be sealed is heavier than the standard weight, a second scale-pan supported on the same arm of the beam as the other scale-pan, and means for conducting the surplus material to the second scale-pan; substantially as described.

In testimony whereof I affix my signature in presence of two witnesses.

CHARLES B. CARR.

Witnesses:
A. B. NOYES,
H. A. FARNHAM.